(12) United States Patent
Ngan

(10) Patent No.: US 7,415,242 B1
(45) Date of Patent: Aug. 19, 2008

(54) METHOD AND SYSTEM FOR PROXIMITY DETECTION FOR AN IN-BUILDING WIRELESS REPEATER

(75) Inventor: John Cheong Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 192 days.

(21) Appl. No.: 10/704,894

(22) Filed: Nov. 10, 2003

(51) Int. Cl.
 *H04B 7/15* (2006.01)

(52) U.S. Cl. .............................. 455/11.1; 455/7; 455/9; 455/13.1; 455/16; 455/574; 370/274; 370/279; 370/293; 370/315

(58) Field of Classification Search .............. 455/6, 455/7, 8, 9, 11.1, 13.1, 16, 41.1, 41.2, 41.3, 455/574, 572, 414.1, 571, 13.4, 426.1, 522, 455/561, 10, 550.1, 552.1, 553.1, 446, 13.3, 455/343.1, 343.4, 343.5; 370/226, 273, 274, 370/293, 315, 492, 279; 375/211, 212, 214
See application file for complete search history.

(56) References Cited

U.S. PATENT DOCUMENTS

| | | | | |
|---|---|---|---|---|
| 4,949,340 | A * | 8/1990 | Smith et al. | 370/226 |
| 5,056,152 | A * | 10/1991 | Truby et al. | 455/11.1 |
| 5,767,788 | A * | 6/1998 | Ness | 340/825.49 |
| 5,930,240 | A * | 7/1999 | Wichman | 370/315 |
| 6,373,833 | B1 * | 4/2002 | Suonvieri et al. | 370/347 |
| 6,459,881 | B1 * | 10/2002 | Hoder et al. | 455/11.1 |
| 6,571,103 | B1 * | 5/2003 | Novakov | 455/464 |
| 6,650,871 | B1 * | 11/2003 | Cannon et al. | 455/41.2 |
| 6,687,487 | B1 * | 2/2004 | Mosebrook et al. | 455/11.1 |
| 6,804,491 | B1 * | 10/2004 | Uesugi | 455/11.1 |
| 6,826,387 | B1 * | 11/2004 | Kammer | 455/41.2 |
| 6,968,153 | B1 * | 11/2005 | Heinonen et al. | 455/11.1 |
| 7,062,224 | B2 * | 6/2006 | Baker et al. | 455/9 |
| 2002/0028655 | A1 * | 3/2002 | Rosener et al. | 455/16 |
| 2002/0065094 | A1 * | 5/2002 | Schmutz et al. | 455/522 |
| 2002/0142797 | A1 * | 10/2002 | Tarighi et al. | 455/556 |
| 2002/0146980 | A1 * | 10/2002 | Solondz et al. | 455/21 |
| 2002/0169539 | A1 * | 11/2002 | Menard et al. | 701/200 |
| 2003/0220074 | A1 * | 11/2003 | Wee et al. | 455/11.1 |
| 2004/0203342 | A1 * | 10/2004 | Sibecas et al. | 455/11.1 |
| 2004/0224631 | A1 * | 11/2004 | Davis et al. | 455/11.1 |
| 2005/0042999 | A1 * | 2/2005 | Rappaport | 455/307 |

OTHER PUBLICATIONS

Sasikanth Avancha, Anupam Joshi, Timothy Finin, Ehanced Service Discovery in Bluetooth, Jun. 2002, IEEE computer, vol. 35, Issue: 6, pp. 96-99.*

* cited by examiner

*Primary Examiner*—Charles N Appiah
*Assistant Examiner*—Olumide T Ajibade Akonai (57) ABSTRACT

A repeater for a wireless network might use a first communication interface to detect the presence of a wireless device. Alternatively, another network element might use the first communication interface to detect the presence of the wireless device and then provide a notification to the repeater. The first communication interface might be a low-power communication interface, such as one that uses Bluetooth. In response to detecting a wireless device or receiving a notification, the repeater might switch to an active mode and begin repeating signals on the wireless network via a second communication interface, such as one that uses CDMA.

20 Claims, 9 Drawing Sheets

METHOD AND SYSTEM FOR PROXIMITY DETECTION FOR AN IN-BUILDING WIRELESS REPEATER

FIELD OF THE INVENTION

The present invention relates to wireless communications. More specifically, it relates to a method and system for proximity detection for a wireless in-building repeater.

BACKGROUND OF THE INVENTION

Cellular wireless is an increasingly popular means of personal communication in the modern world. People are using cellular wireless networks for the exchange of voice and data over wireless devices, such as cellular telephones, personal digital assistants ("PDAs"), cellular telephone modems and other devices. In principle, a user can seek information over the Internet or call anyone over a public switched telephone network ("PSTN") from any place inside the coverage area of the cellular wireless network.

In a typical cellular wireless system, an area is divided geographically into a number of cell cites, each defined by a radio frequency ("RF") radiation pattern from a respective base transceiver station ("BTS") antenna. The base station antennae in the cells are in turn coupled to a base station controller ("BSC"), which is then coupled to a telecommunications switch (e.g., a mobile switching center ("MSC")) or a gateway (e.g., a packet data serving node ("PDSN")) that provides connectivity with a transport network, such as the PSTN or the Internet.

When a wireless device is positioned in a cell, the wireless device and the base station can communicate with each other in various channels over the RF air interface. Communications from the base station to a wireless device are considered to be in a "forward" direction, so the air interface channels used to carry such communications are referred to as the "forward link" channels. Conversely, communications from a wireless device to the base station are considered to be in a "reverse" direction, so the air interface channels used to carry such communications are referred to as "reverse link" channels. These directional labels, however, are merely arbitrary, and other orientations might also be used.

With the continued growth in popularity of wireless communications, people are increasingly engaging in cellular wireless communications in place of traditional landline communications. This is of course most notable within buildings, such as homes and offices, where landline communications, such as traditional telephones and computer networks, were once the only method available. Use of wireless devices instead of fixed landline terminals conveniently allows for free movement within such buildings as well as into and out of the buildings.

Unfortunately, however, cellular wireless communications can suffer from varying levels of signal degradation as signals are carried over the air interface between the wireless devices and the base station. Most significantly, for instance, the strength of signals transmitted in the forward link direction from the base station to the wireless device can diminish substantially as the signals travel over increased distance to the wireless device. Further, obstructions such as buildings and foliage can attenuate or otherwise degrade signals passing over the air interface.

When a wireless device operates within a building, the problem can be even more acute, as the structure of the building can further diminish the signal. In a worst case scenario, forward link signals that ultimately arrive at a wireless device within a building may be too weak to be detected and/or used by the wireless device. As a result, service could be unavailable and wireless communications could be blocked or dropped. This is clearly a problem for cellular wireless carriers who are seeking to promote in-building use of their services.

One approach that can be used to overcome this difficulty is to increase the power transmitted by the base station. A disadvantage with this approach, however, is that the increased power can lead to increased interference in adjacent cells. This, in turn, can decrease the capacity of the wireless network. The power increase can also interfere with other wireless devices in use around the base station. The magnitude of the power increase proportionally affects the amount of interference produced by the base station, with a greater power increase causing a greater interference.

Also, this approach would only solve half the problem. Increasing the signal strength from the base station would allow a wireless device to receive the base station's signals in areas that highly attenuate that signal. It would not aid the base station in receiving signals from a wireless device. Cellular service is primarily a bi-directional mode of communication, in which connections are established and maintained through control signals that are sent in both directions between the base station and a wireless device. Therefore, in order to support bi-directional communication, an increase in the transmission power of the base station would require a corresponding increase in the transmission power of the wireless device.

Another approach to help increase wireless signal strength within a building is to provide a distributed antenna system in the building. In this approach, a hub is connected, via wired links, to one or more repeaters in the building. The wired link is typically a coaxial cable, a 10 Base-T cable or a fiber optical cable. The hub transmits the RF signals from the base station to the repeaters via the wired links. The repeaters, in turn, transmit the RF signals into the building, where they may be received by wireless devices. Similarly, the repeaters receive RF signals transmitted by the wireless devices and in turn transmit the RF signals to the hub via the wired links. The hub, in turn, transmits the RF to the base station. In this way, the wireless coverage area provided by the base station may be enhanced within the building.

A disadvantage to this approach, however, is that the repeaters remain active regardless of whether any wireless devices are in range of the repeaters. In addition to needlessly broadcasting signals that would not then be received by any wireless device, the repeaters would continue to consume power and other wireless network resources. Although the repeaters might be deactivated or placed in a standby mode, they might not then be readily available when a wireless device moves within range.

Therefore, there exists a need from an improved way of implementing in-building repeaters for a wireless network.

SUMMARY OF THE INVENTION

In an exemplary embodiment, a repeater uses a first communication interface to detect the presence of a wireless device. The first communication interface is a low-power communication interface, such as one that uses Bluetooth. In response to detecting the presence of a wireless device, the repeater begins repeating signals on the wireless network via a second communication interface. The second communication is a relatively higher powered communication interface, for example, a CDMA interface.

In alternate embodiments, one or more presence terminals connect to the repeater. The presence terminals also use the first communication interface to detect the presence of a wireless device. A presence terminal that detects the presence of a wireless device then provides a notification to the repeater. Upon receiving the notification, the repeater switches to an active mode and begins repeating signals on the wireless network, or if the repeater is already in the active mode, it continues to repeat signals on the wireless network.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
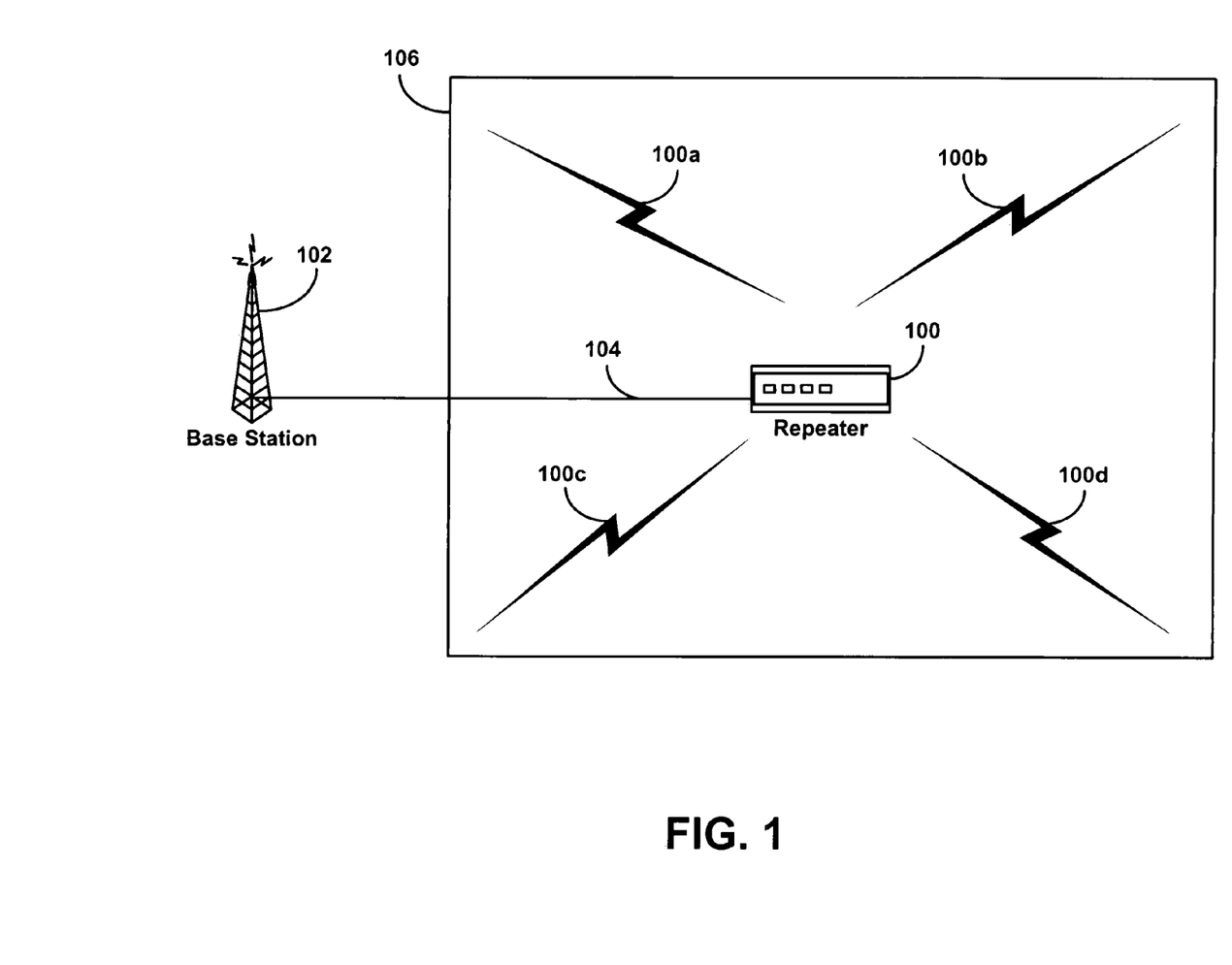
FIG. 1 is block diagram of an exemplary wireless network configuration that uses a repeater having proximity detection in order to switch the repeater between active and standby modes.

FIG. 1 is block diagram of an exemplary wireless network configuration that uses a repeater having proximity detection in order to switch the repeater between active and standby modes. A repeater 100 may connect to a base station 102 for a wireless network via wired data link 104. The base station 102 is merely exemplary in nature, however, and it is not necessary that the repeater connects to a base station 102. The particular network element that connects to the repeater might vary depending on the type and configuration of the wireless network. Also, the repeater 100 might communicate with the base station 102 or other network element through a wireless data link instead of the wired data link 104.

The repeater 100 generally functions to repeat signals sent to and from wireless devices on the wireless network. For example, the repeater 100 can receive signals that are transmitted from wireless devices. The repeater 100 can then send the signals through the wired data link 104 to the base station 102, which in turn can transmit the signals over a wired or wireless data link to one or more other devices or network elements. Similarly, the repeater 100 might receive signals from the base station 102 via the wire data link 104, and in turn the repeater 100 can transmit those signals to wireless devices within range of the repeater. In alternate embodiments, the repeater 100 might be a unidirectional repeater.

As depicted in FIG. 1, the repeater 100 might be located within a building 106 or other structure, while the base station 102 might be located outside the building 106. Where signals from the base station 102 do not propagate well through the building 106 and might not even be received by wireless devices in one or more parts of the building 106, the repeater 100 can be used to extend of the range of the wireless network by allowing wireless devices inside the building 106 to communicate with the base station 102 through the repeater 100. The repeater 100 can also aid in extending the range of the wireless network where signals from the base station 102 might be strong enough to travel into the building 106 but signals from the wireless device might not be strong enough to travel out of the building 106.

FIG. 1 depicts the repeater 100 as transmitting signals throughout the building, shown generically as four wireless signals 100a-d. Thus, the range of the repeater 100 extends through the entire building, and any wireless device in the building 106 would be able to receive signals transmitted by the repeater 100. Alternatively, the repeater 100 might have a reduced range such that its signals only propagate through a portion of the building 106. In order to further extend the coverage of the wireless network, more than one repeater might be used inside the building 106.

Although the repeater 100 can advantageously extend the range of the wireless network inside the building 106, the wireless network might expend power, computational overheard or other resources to support the repeater 100. Additionally, signals transmitted from the repeater 100 might interfere with signals on other wireless networks or with other devices within the building 106. This is not an exhaustive list of disadvantages to using the repeater 100, and others might also exist.

While these disadvantages might be more than balanced out when the repeater 100 is actively communicating with wireless devices inside the building 106 and thereby actively extending the range of the wireless network, this might not then be the case when no wireless devices are within range of the repeater 100. Therefore, it might be advantageous to have the repeater 100 function in an active mode when one or more wireless devices are within range of the repeater 100 but enter a standby mode in order to alleviate some of these disadvantages when wireless devices are not within range of the repeater 100.

In order to switch between an active mode and a standby mode, the repeater 100 might detect when a wireless devices moves within range of the repeater 100. In response to determining that a wireless device has moved within range of the repeater 100, the repeater 100 might switch from a standby mode to an active mode, thereby functioning to repeat signals to and from the wireless device on the wireless network. When the repeater 100 then detects that the wireless device is no longer within its range, the repeater 100 might switch from the active mode back to the standby mode.

The repeater 100 might detect that a wireless device is within its range in a variety of different ways. For example, the repeater 100 might transmit signals over a first communication interface. These signals might be requests to wireless devices within range of the repeater 100 to identify themselves to the repeater 100. That is, a wireless device within range of the repeater 100 might receive one of these requests over the first communication interface and respond by notifying the repeater 100 of its presence. The repeater 100 might then switch from a standby mode to an active mode and thereby begin actively repeating signals to and from the wireless device on the wireless network.

The repeater 100 might use a second communication interface to repeat signals to wireless devices on the wireless network. While the first communication interface might be a low-power communication interface, the second communication interface might be a relatively higher powered communication interface. The higher powered second communication interface might allow the repeater 100 to have a sufficient range within the building 106 to adequately communicate with wireless devices. The repeater 100 might both send signal to wireless devices via the second communication interface and receive signals from wireless devices via the second communication interface.

The low-power first communication interface, however, might then be used when the repeater 100 is seeking to determine whether any wireless devices are within its range. When the repeater 100 has not yet detected any device, it might only be communicating via the first communication interface and not via the second communication interface. This might advantageously conserver power, reduce any interference with other wireless signals, and/or reduce the computational overhead associated with using the repeater 100 on the wireless network. There might be other advantages as well.

The first communication interface might be any type of wireless communication interface, however, in one preferred embodiment the first communication interface is a Bluetooth communication interface. Bluetooth is a packet-switched protocol that operates in the 2.45 GHz Industrial Scientific and Medical ("ISM") band, and it frequency-hops at a rate of 1600 hops/second. Bluetooth has a range of approximately 10 meters, however, this might vary depending on the particular version of Bluetooth that is employed. Bluetooth's use of short data packets and adaptive output power minimizes interference and maximizes throughput in even relatively noisy environments.

Bluetooth is generally considered a low-power protocol. In standby mode, a Bluetooth transceiver generally draws only about 0.3 mA. During data transfer, the maximum current drain is 30 mA; however, the drain might be less than this during pauses or at lower data rates. The low power drains and the adaptive power scheme conserve resources in mobile devices or in other devices that use Bluetooth. By using Bluetooth to determine whether any wireless devices are within its range, the repeater 100 might conserve power while still continuously checking for wireless devices.

The second communication interface might also be any type of wireless communication interface. However, the second communication interface is preferably a different type of communication interface than that first communication interface. For example, where the first communication interface is a Bluetooth communication interface, the second communication interface preferably uses a protocol other than Bluetooth. In some embodiments, however, the first and second communication interfaces might use some or all of the same protocols.

In one embodiment, the second communication interface might be a Code Division Multiple Access ("CDMA") communication interface. CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

In alternate embodiments, the second communication interface might use Institute of Electrical and Electronics Engineers ("IEEE") 802.11a, 802.11b, 802.11g or another protocol under the 802.11 umbrella. Still alternatively, the second communication interface might use Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), IS-136, Time Division Multiple Access ("TDMA") or another protocol.

Figure 2:
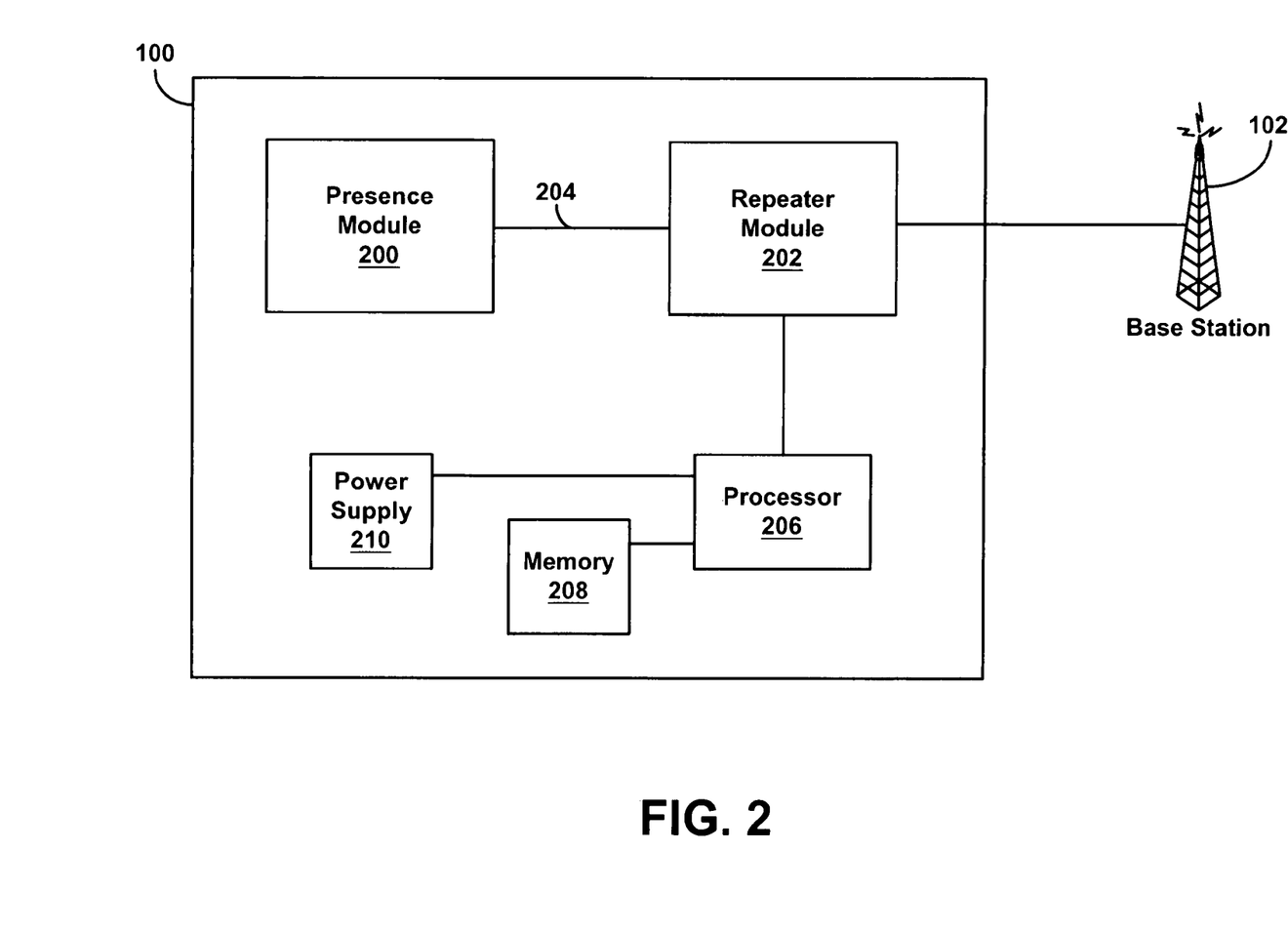
FIG. 2 is a block diagram of an exemplary implementation of the repeater of FIG. 1.

FIG. 2 is a block diagram of an exemplary implementation of the repeater of FIG. 1. The repeater 100 includes both a presence module 200 and a repeater module 202. The presence module 200 communicates with wireless devices via the first communication interface, while the repeater module 202 communicates with wireless devices via the second communication interface. In one embodiment, the presence module 200 might use Bluetooth to communicate with wireless devices, while the repeater module 202 might use a protocol other than Bluetooth to communicate with the wireless devices.

The presence module 200 might be continually active, while the repeater module 202 might have both active and standby modes. When the presence module 200 has not yet detected any wireless devices within range of the repeater 100, the repeater module 202 might be in the standby module and not actively repeating signals on the wireless network. When the presence module 200 detects that a wireless device is within range of the repeater 100, it might provide a notification to the repeater module 202 in order to activate the repeater module 202.

As illustrated in FIG. 2, the presence module 200 can connect to the repeater module 202 through a wired connection 204, and the two modules 200, 202 can communicate over the wired connection 204. Any communication protocol might be used by the modules 200, 202 to communicate over the wired connection 204. In a preferred embodiment, the two modules 200, 202 use RFCOMM, which is a simple transport protocol typically supported in the Bluetooth protocol. RFCOMM would therefore be a convenient method of communicating with the repeater module 202 when the presence module 200 uses Bluetooth and therefore inherently supports RFCOMM.

RFCOMM provides emulation of RS232 serial ports over the Logical Link Control and Adaptation Layer Protocol ("L2CAP") protocol. Two devices using RFCOMM may open multiple emulated serial ports. RFCOMM supports up to 60 open emulated ports; however, the number of ports that can be used in a device is generally depends on the particular implementation used by the device. Once an emulated port has been established, the two devices then communicate through an emulation of the nine circuits of an RS-232 interface, which are listed below in Table 1.

TABLE 1

| Pin Circuit Name |
|---|
| 102 Signal Common |
| 103 Transmit Data (TD) |
| 104 Received Data (RD) |
| 105 Request to Send (RTS) |
| 106 Clear to Send (CTS) |
| 107 Data Set Ready (DSR) |
| 108 Data Terminal Ready (DTR) |

TABLE 1-continued

Pin Circuit Name

109 Data Carrier Detect (CD)
125 Ring Indicator (RI)

L2CAP generally runs below the RFCOMM layer and above the Baseband protocol layer in the Bluetooth protocol stack. L2CAP resides in the data link layer and provides connection-oriented and connectionless data services to upper layer protocols with protocol multiplexing capability, segmentation and reassembly operation, and group abstractions. L2CAP permits higher level protocols and applications to transmit and receive L2CAP data packets up to 64 kilobytes in length.

In addition to the two modules 200, 202, the repeater 100 might include other components. For example, the repeater 100 might further include a processor 206 that controls the operation of one or both of the modules 200, 202. The processor 206 might also control other circuitry in the repeater 100. The processor 206 might connect to a memory 208 that stores programs and data used by the processor 206. The memory 208 can be any type of volatile or non-volatile memory, such as a RAM, ROM, EPROM, EEPROM, hard disk or another type of memory. Additionally, the repeater 100 might include a power supply 210, such as a battery or a connection to an external power source.

Various changes might be made to the exemplary repeater depicted in FIG. 2. For example, the processor 206 or other control circuitry might be included in the presence module 200 or the repeater module 202. In another example, the presence module 200 and the repeater module 202 might be implemented in combined circuitry instead of as the distinct components depicted in FIG. 2. While FIG. 2 depicts the base station 102 interfacing directly with the repeater module 202, the repeater 100 might alternatively include additional circuitry for interfacing with the base station 102 or the base station 102 might interface with a component other than the repeater module 102. Also as previously described, the repeater 100 might interface with a wireless network component other than the base station 102. These changes are provided merely by way of example, and other changes are also possible.

The low-power signals sent over the first communication interface might have a significantly less range than the higher powered signals sent over the second communication interface. For example, if the presence module 200 uses Bluetooth, then its signals might only have a range of approximately 15-20 feet. The activation module 202, however, might use a protocol that has a range of tens of feet, hundreds of feet or greater. Therefore, a wireless device might be close enough to the repeater 100 to communicate over the second communication interface but not close enough to communicate over the first communication interface. This might inhibit the repeater 100 from detecting the presence of the wireless device and responsively activating the repeater module 202.

In order to extend the range within which the repeater 100 can detect a wireless device, the repeater 100 might connect to one or more presence terminals. The presence terminals might serve a similar function to the presence module 200 that is located within the repeater 100. The presence terminals might be distributed throughout the coverage area of the repeater 100, and they might each use the first communication interface to detect the presence of a wireless device. If one of the presence terminals detects a wireless device, the presence terminal can responsively notify the repeater 100, which can then begin repeating signals on the wireless network over the second communication interface.

Figure 3:
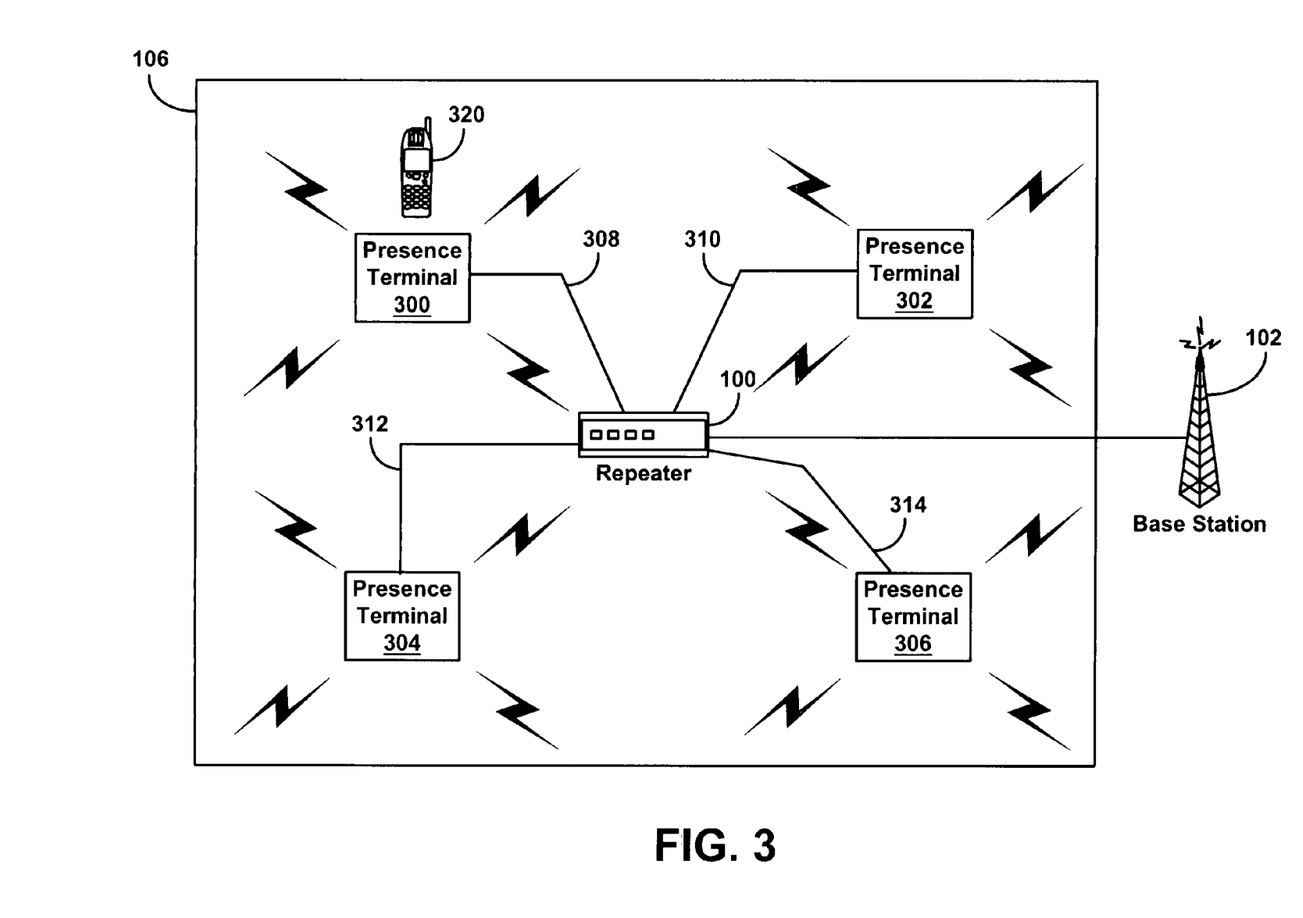
FIG. 3 is a block diagram of an exemplary system in which the repeater of FIG. 1 interfaces with multiple presence terminals.

FIG. 3 is a block diagram of an exemplary system in which the repeater of FIG. 1 interfaces with multiple presence terminals. As depicted in FIG. 3, the repeater 100 interfaces with a first presence terminal 300, a second presence terminal 302, a third presence terminal 304 and a fourth presence terminal 306. The presence terminals 300-306 are distributed throughout the building 106, which in this example generally corresponds with the coverage area of the repeater 100. Although the presence terminals 300-306 are preferably distributed throughout the entire coverage area of the repeater, other distributions might also be used. Also, while FIG. 3 depicts a generally symmetric arrangement, non-symmetric arrangements might alternatively be used.

The presence terminals 300-306 each transmit signals via the first communication interface in order to detect the presence of a wireless device. FIG. 3 depicts these signals emanating respectively from the four presence terminals 300-306. As is illustrated in FIG. 3, these signals have a limited range when compared to the signals 100a-d transmitted by the repeater 100 via the second communication interface. Placing the presence terminals 300-306 throughout the coverage area of the repeater 100 expands the area in which wireless devices can be detected using the first communication interface.

The four presence terminals 300-306 each connect to the repeater 100 through respective wired connections 308-314, although wireless connections might also be used. The presence terminals 300-306 can communicate with the repeater 100 via the wired connections 308-314 using variety of different protocols. For example, the presence terminals 300-306 and repeater 100 might use RFCOMM to communicate over the wired connections 308-314. Other protocols might be used as well.

In an exemplary operation, a wireless device 320 might move within range of the first presence terminal 300. The wireless device 320 might then detect signals transmitted by the first presence terminal 300 via the first communication interface, and it might respond to the presence terminal 300. Upon detecting the wireless device 320, the presence terminal 300 might send a notification to the repeater 100 via the wired connection 308. In response to the notification, the repeater 100 might activate the repeater module 202 and begin repeating signals on the wireless network via the second communication interface.

In one embodiment, the repeater 100 might continue repeating signals on the wireless network via the second communication interface so long as one of the presence terminals 300-306 detects the presence of the wireless device 320. For example, the first presence terminal 300 might periodically transmit a notification to repeater 100 indicating that the wireless device is still within range of the repeater 100. As long as the repeater 100 receives these periodic notifications, it might continue to keep the repeater module 202 in the active mode. However, if the repeater 100 does not detect one of these notifications within a predetermined amount of time, it might "time out" and switch the repeater module 202 to the standby mode.

While the wireless device 320 might initially be within range of one of the presence terminals, it might move out of range of that presence terminal and into the range of another presence terminal all while continuing to communicate with the repeater 100 over the second communication interface. For example, FIG. 3 depicts the wireless device 320 initially within range of the first presence terminal 300, which detects the wireless device 320 and notifies the repeater 100. In response to the notification, the repeater 100 begins repeating signals on the wireless network. The wireless device 320 might then change location and move within range of a different present terminal.

Figure 4:
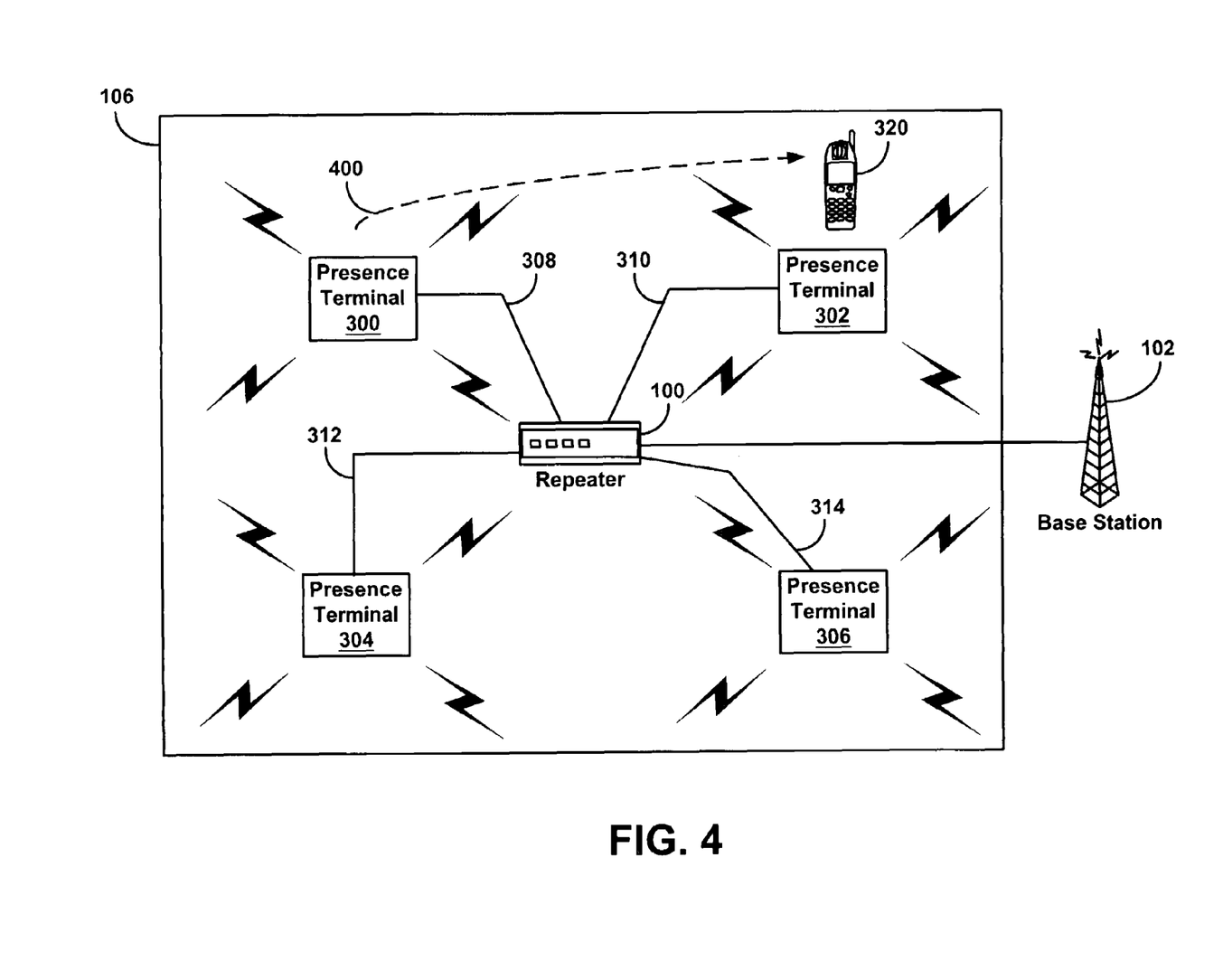
FIG. 4 is a block diagram depicting a wireless device moving between presence terminals interfaced with the repeater of FIG. 1.

FIG. 4 is a block diagram depicting a wireless device moving between presence terminals interfaced with the repeater of FIG. 1. FIG. 4 depicts the wireless device 320 moving from its initial position within range of the first presence terminal 300 to a position within range of the second presence terminal 302. The movement of the wireless device 320 is shown generally by a dashed line 400. The second presence terminal 302 might then detect that the wireless device 320 is now within its range and provide a notification to the repeater 100. As the repeater 100 is already actively repeating signals on the wireless network, it might continue to repeat signals. Thus, as long as the repeater 100 continues to receive notifications from at least one of the presence terminals 300-306, it might continue to repeat signals on the wireless network.

Figure 5:
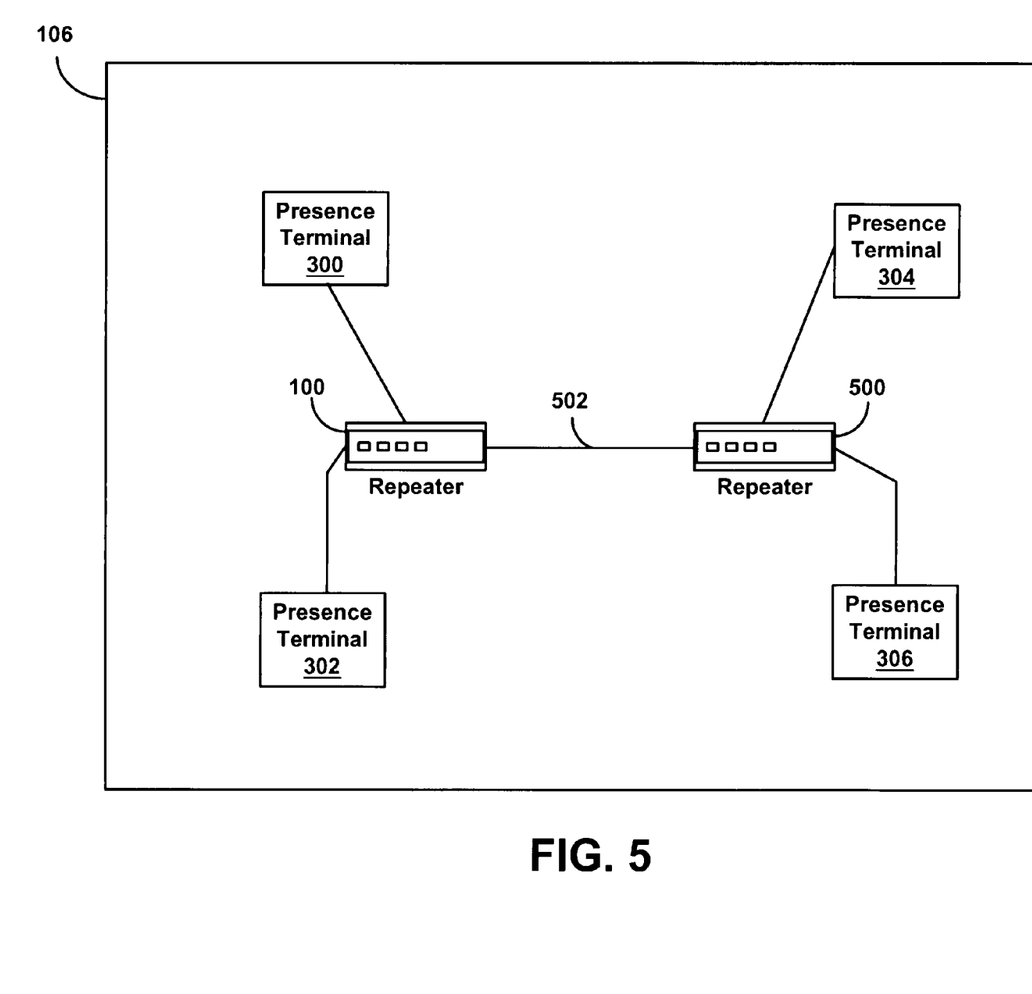
FIG. 5 is a block diagram of a configuration in which multiple repeaters interface with multiple presence terminals.

FIG. 5 is a block diagram of a configuration in which multiple repeaters interface with multiple presence terminals. As previously described, the building 106 might include more than one repeater. FIG. 5 depicts two repeaters 100, 500, but alternate configurations might include more than two repeaters. In this configuration the repeater 100 connects to the first and second presence terminals 300, 302, while an additional repeater 500 connects to the third and fourth presence terminals 304, 306. Each repeater 100, 500 might alternatively connect with a greater or fewer number of terminals, and the repeaters 100, 500 might each connect to a different number of presence terminals.

Although not depicted, each repeater 100, 500 might connect to a base station or other wireless network component. For example, each repeater 100, 500 might connect to the base station 102. It is not necessary that each repeater 100, 500 connect with the same wireless network component. For example, the repeater 100 might connect with the base station 102, while the other repeater 500 might only connect with the first repeater 100. Alternatively, the other repeater 500 might connect to a different base station or to some other wireless network element.

The first and second presence terminals 300, 302 might control the activation of the repeater 100, while the third and fourth presence terminals 304, 306 might control the activation of the additional repeater 500. The repeaters 100, 500 might optionally be connected via a data link 502. The data link 502 depicted in FIG. 5 is a wired data link, but it might alternatively be a wireless data link. The repeaters 100, 500 might communicate with each other through the data link 502.

For example, the first presence terminal 300 might detect a wireless device and responsively notify the repeater 100. The repeater 100 might then switch to an active mode. In addition, the repeater 100 might provide a notification to the other repeater 500 via the data link 502. In response to this notification, the other repeater 500 might also switch to an active mode. Thus, a notification from one of the presence terminals might be used to switch more than one repeater to an active mode.

Figure 6:
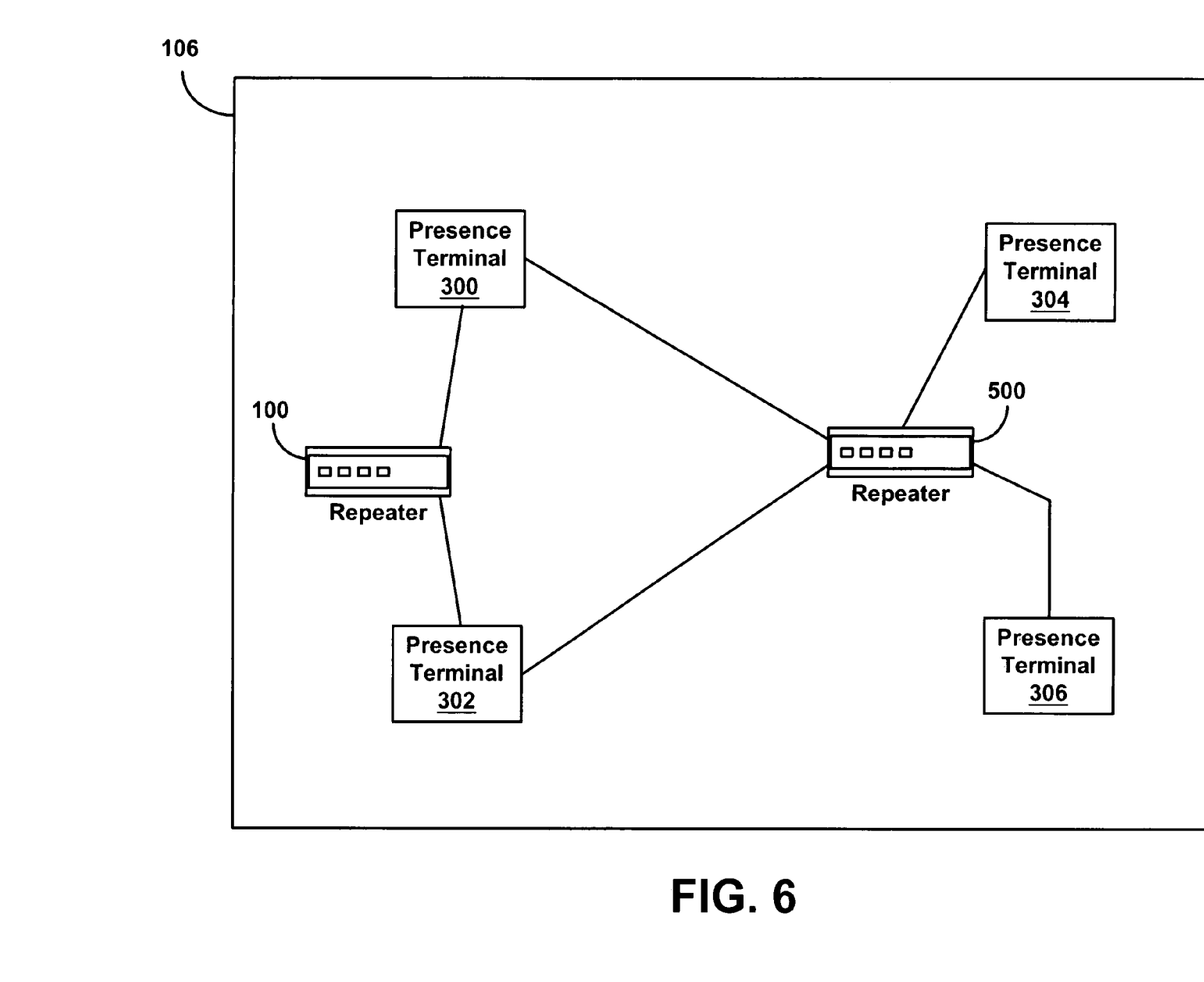
FIG. 6 is a block diagram of an alternate configuration in which multiple repeaters interface with multiple presence terminals.

FIG. 6 is a block diagram of an alternate configuration in which multiple repeaters interface with multiple presence terminals. In this configuration the first and second presence terminals 300, 302 interface directly with both repeaters 100, 500. The third and fourth presence terminals 304, 306 each interface with only the additional repeater 500, and the two repeaters 100, 500 do not interface with each other.

Accordingly, the first or second presence terminals 300, 302 might detect the presence of a wireless device and provide a notification directly to both repeaters 100, 500. However, notifications from the third or fourth presence terminal 304, 306 would be sent only to the additional repeater 500 instead of to both repeaters 100, 500.

Alternatively, the third and fourth presence terminals 304, 306 might be connected directly to the repeater 100 so as to enable them to active both repeaters 100, 500. Still alternatively, the repeaters 100, 500 might be connected via a data link. Thus, a repeater might be activated through a direct notification from a presence terminal or through a notification from another repeater.

Figure 7:
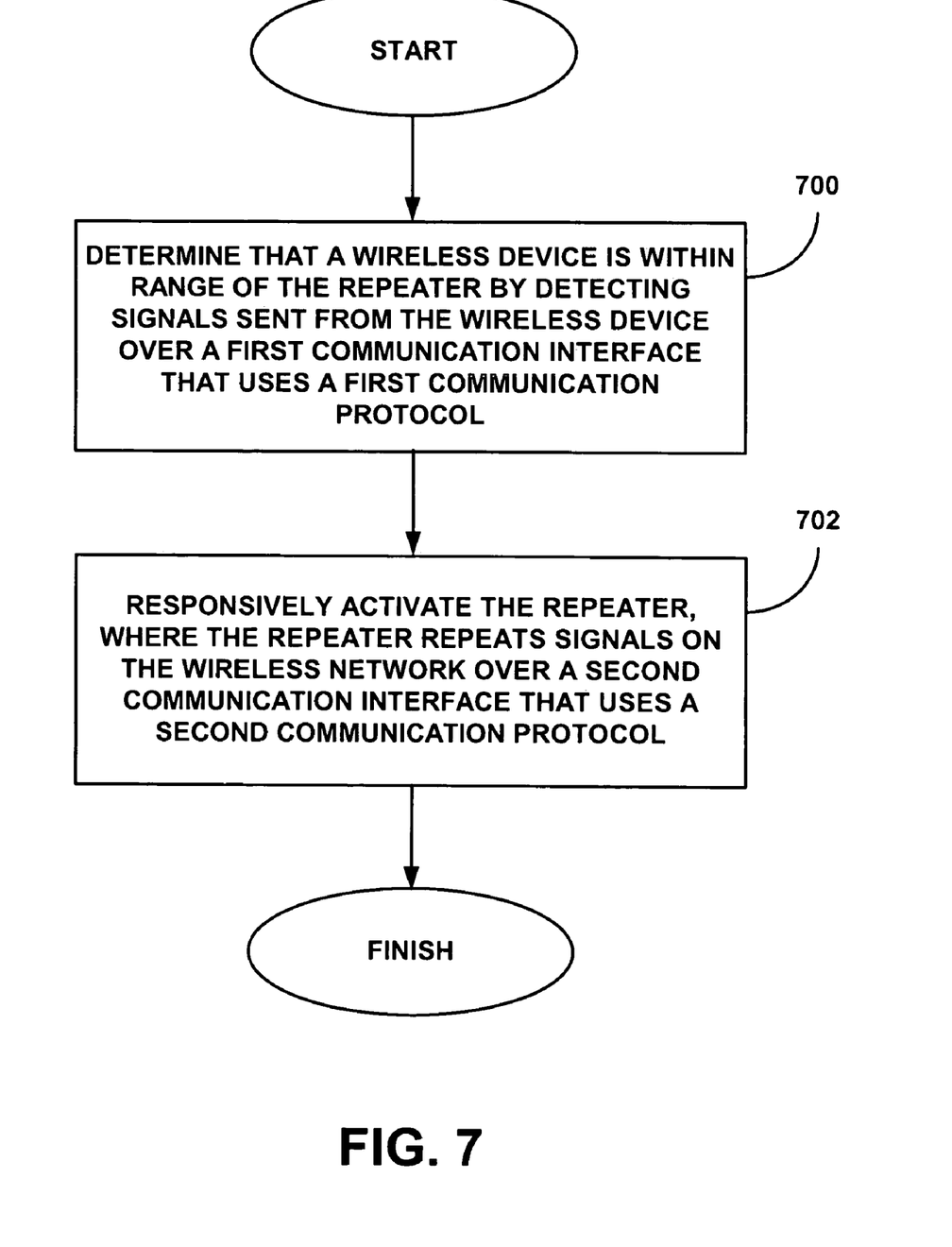
FIG. 7 is a flowchart of an exemplary process for activating a repeater for a wireless network.

FIG. 7 is a flowchart of an exemplary process for activating a repeater for a wireless network. At Step 700, an element in the wireless network determines that a wireless device is within range of the repeater by detecting signals from the wireless device over a first communication interface that uses a first communication protocol. Many different elements might detect the signals. For example, one of the presence terminals 300-306 might detect the signals. In another example, the repeater 100 itself might detect the signals.

At Step 702, the element responsively activates the repeater, wherein the repeater repeats signals on the wireless network over a second communication interface that uses a second communication protocol. When one of the presence terminals detects a signal from the wireless device over the first communication interface, the presence terminal might provide a notification to the repeater 100 in order to cause the repeater 100 to begin actively repeating signals on the wireless network. When the repeater 100 itself detects signals from the wireless device over the first communication interface, the repeater 100 might then activate its repeater module 202 and begin repeating signals on the wireless network.

Figure 8:
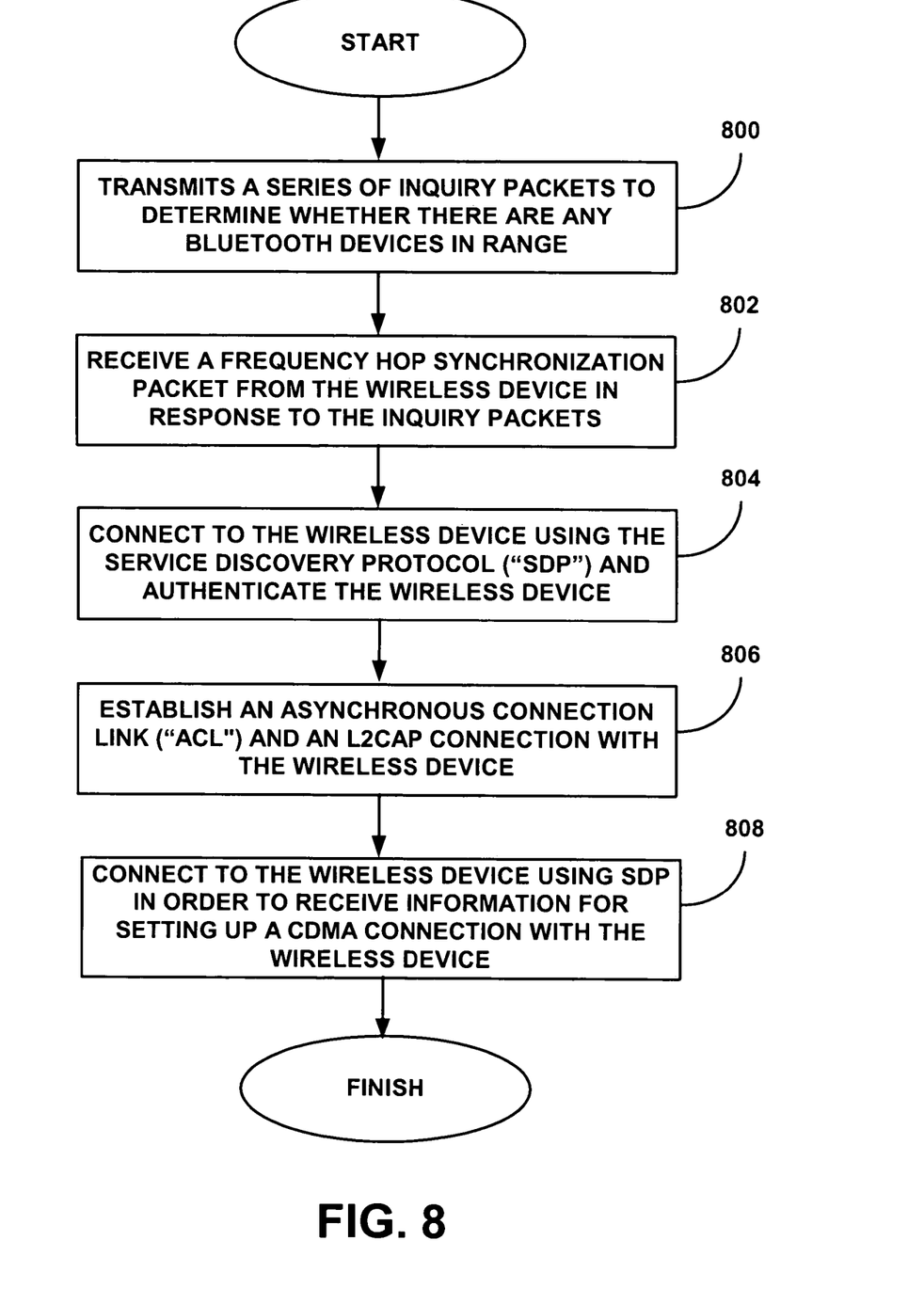
FIG. 8 is a flowchart of an exemplary process for determining that a wireless device is within range of the repeater by detecting signals sent form the wireless device over a first communication interface.

FIG. 8 is a flowchart of an exemplary process for determining that a wireless device is within range of the repeater by detecting signals sent form the wireless device over a first communication interface. This process might be used to perform Step 700 of FIG. 7. It might be used, for example, by the repeater 100 or by one of the presence terminals 300-306. Additionally, while this flow depicts an exemplary operation in which the first communication interface uses Bluetooth and the second communication interface uses CDMA, the process might alternatively be adapted for other types of communication interfaces.

At Step 800, an element transmits a series of inquiry packets to determine whether there are any Bluetooth devices in range. The inquiry packets are transmitted over the first communication interface, which in this example uses Bluetooth. At Step 802, the element receives a frequency hop synchronization ("FHS") packet from the wireless device in response to the inquiry packets. Thus, the wireless device might receive the inquiry packets and responsively send one or more FHS packets to the element that sent the inquiry packets.

At Step 804, the element connects to the wireless device using the Service Discovery Protocol ("SDP") and authenticates the wireless device. SDP is defined in the Bluetooth standard. It provides a means for applications to discover what services are available and to determine the characteristics of those services. In this case, an SDP connection can be used to authenticate the wireless device. That is, the element can use the SDP connection to obtain information from the wireless device, such as its electronic serial number ("ESN"), system identification or some other identifier. Using one or more of these identifiers, the element can determined whether the wireless device is authorized to access the wireless network.

If the wireless device is authorized to access the wireless network, the element might establish an asynchronous connection link ("ACL") and an L2CAP connection with the wireless device, as shown at Step 806. ACL and L2CAP are also both defined within the Bluetooth standard and operate at different levels in the protocol stack to enable communications between two Bluetooth devices. The element might then connect to the wireless device using SDP in order to receive information for setting up a CDMA connection with the wireless device, as shown at Step 808.

Depending on the wireless network configuration, however, the element might not need to setup parameters with wireless devices prior to beginning to repeat signals on the wireless network over the second communication interface. For example, the repeater 100 might not need to setup a CDMA connection with the wireless device in order to successfully repeat CDMA signals over the second communication interface. Thus, in response to an indication to switch to the active mode, the repeater 100 could just begin repeating signals over the second communication interface without having to engage in additional setup with wireless devices. Thus, in some embodiments, Steps 806 and 808 might not be performed.

Thus, the repeater 100 might use CDMA to repeat signals on the wireless network via the second communication interface. Before to repeating those signals, however, the repeater 100 might establish a connection with the wireless device. Where the repeater 100 performs this process, it might receive the information directly from the wireless device and use that information to setup the CDMA connection. Where one of the presence terminals 300-306 performs this process, the presence terminal might pass this information along to the repeater 100 for use in setting-up the CDMA connection.

Figure 9:
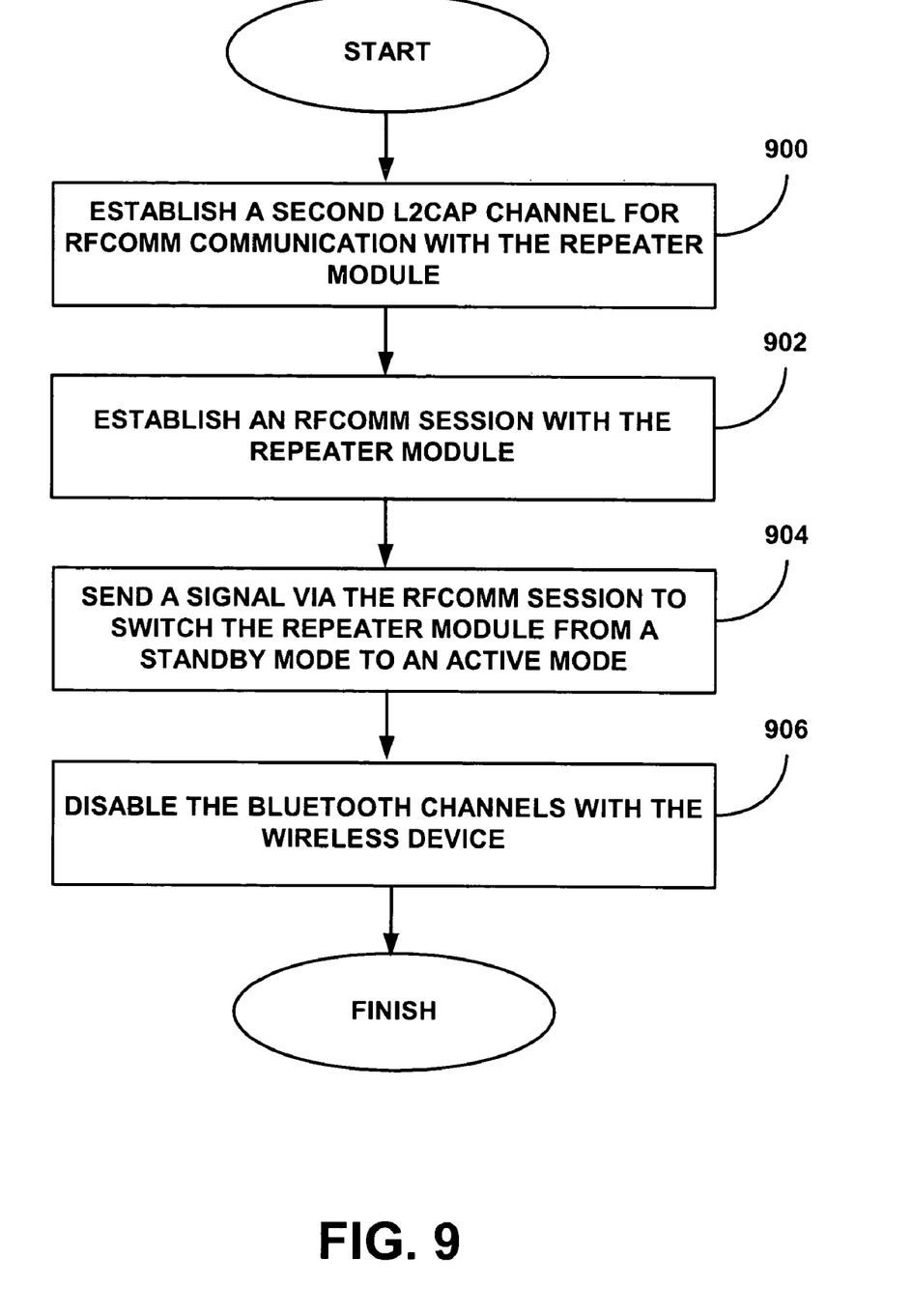
FIG. 9 is a flowchart of an exemplary process for responsively activating the repeater.

FIG. 9 is a flowchart of an exemplary process for responsively activating the repeater. This process might be used, for example, to implement Step 702 of FIG. 2. The repeater 100 or one of the presence terminals 300-306 might use this process. While the process describes an exemplary communication between two Bluetooth devices, it might alternatively be adapted for use with other protocols.

At Step 900, an element establishes a second L2CAP channel for RFCOMM communication with the repeater module. Where the element is the presence module 200 within the repeater 100, it might communicate with the repeater module 202 via the data link 204. Where the element is one of the presence terminals 300-306, the presence terminal might establish this channel with some component in the repeater 100, such as the repeater module 202.

An RFCOMM session can be run over an L2CAP channel. Thus, to support RFCOMM communications, the element and the wireless device might first establish an L2CAP channel. Then, they might establish an RFCOMM session, as shown at Step 902. The element might then send a signal via the RFCOMM session to switch the repeater module from a standby mode to an active mode, as shown at Step 904. Once the repeater module 202 is activated, the repeater 100 might begin repeating signals on the wireless network via the first communication interface. Optionally, the element might disable the Bluetooth channels with the wireless device, as shown at Step 906.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for activating a repeater for a wireless network, the method comprising:
   a presence terminal determining that a wireless device is within range of the repeater by detecting signals sent from the wireless device over a first communication interface that uses a first communication protocol, wherein the repeater and presence terminal are in different locations, and wherein the wireless device is able to communicate using the first communication protocol and a second communication protocol; and
   responsively activating the repeater, wherein the repeater repeats signals on the wireless network by communicating with the wireless device over a second communication interface that uses the second communication protocol.

2. A computer readable medium having stored therein instructions for causing a processor to execute the method of claim 1.

3. The method of claim 1, further comprising:
   determining that signals are no longer being received from the wireless device over the first communication interface; and
   responsively deactivating the repeater.

4. The method of claim 1, wherein determining that a wireless device is within range of the repeater comprises:
   broadcasting inquiry packets over the first communication interface;
   receiving from the wireless device over the first communication interface a response to the inquiry packets; and
   authenticating that the wireless device is permitted to access the wireless network.

5. The method of claim 1, wherein the first communication protocol is Bluetooth, wherein the second communication protocol is a protocol other than Bluetooth, and wherein determining that the wireless device is within range of the repeater comprises:
   transmitting inquiry packets over the first communication interface;
   receiving a Frequency Hop Synchronization ("FHS") packet from the wireless device over the first communication interface in response to the inquiry packets;
   communicating with the wireless device over the first communication interface to establish a Service Discovery Protocol ("SDP") session for authenticating that the wireless device is authorized to access the wireless network; and communicating with the wireless device through an SDP session over the first communication interface to setup parameters for communication between the repeater and the wireless device over the second communication interface.

6. The method of claim 5, wherein the second communication protocol is CDMA, and wherein the wireless device is a mobile phone.

7. The method of claim 1, wherein responsively activating the repeater comprises:
establishing an RFCOMM session with the repeater; and
sending an indication through the RFCOMM session to cause the repeater to switch from a standby mode to an active mode.

8. The method of claim 1, wherein responsively activating the repeater comprises responsively activating a plurality of repeaters.

9. The method of claim 1, wherein the first communication protocol is Bluetooth and the second communication protocol is CDMA.

10. A repeater for a wireless network comprising:
a repeater module for repeating signals on the wireless network;
a presence module, separate from the repeater module, for using a first communication interface to detect when a wireless device is within range of the repeater and for switching the repeater module from a standby mode to an active mode in response to detecting that the wireless device is within range of the repeater, wherein the wireless device is able to communicate using a first communication protocol and a second communication protocol; and
wherein the first communication interface uses the first communication protocol, and wherein the repeater module repeats signals on the wireless network by communicating with the wireless device over a second communication interface that uses the second communication protocol.

11. The repeater of claim 10, wherein the repeater module and the presence module are connected through a serial connection.

12. The repeater of claim 11, wherein the first communication protocol is Bluetooth, and wherein the repeater module and the presence module use RFCOMM to communicate over the serial connection.

13. The repeater of claim 10, wherein the repeater is communicatively coupled to at least one other repeater for the wireless network.

14. The repeater of claim 10, wherein the repeater is communicatively coupled to a base station for a wireless telecommunications network.

15. A system for repeating signals in a wireless network, the system comprising:
at least one repeater for repeating signals on the wireless network;
at least one presence terminal communicatively coupled to the at least one repeater for using a first communication interface to detect when a wireless device is within range of the at least one repeater and for switching the at least one repeater from a standby mode to an active mode in response to detecting that the wireless device is within range of the repeater, wherein the at least one repeater and the at least one presence terminal are in different locations, and wherein the wireless device is able to communicate using a first communication protocol and a second communication protocol; and
wherein the first communication interface uses the first communication protocol, and wherein the at least one repeater repeats signals on the wireless network by communicating with the wireless device over a second communication interface that uses the second communication protocol.

16. The system of claim 15, wherein the at least one presence terminal is a plurality of presence terminals, wherein the plurality of presence terminals are connected to the repeater via respective serial connections, and wherein the plurality of presence terminals use RFCOMM to communicate with the repeater via the respective serial connections.

17. The system of claim 15, wherein the at least one repeater is a plurality of repeaters, and wherein the plurality of repeaters are each connected to the at least one presence terminal.

18. The system of claim 15, wherein the at least one presence terminal is communicatively coupled to a base station for a wireless network, and wherein the at least one repeater repeats signals to and from the base station for the wireless network.

19. The system of claim 15, wherein the first communication protocol is Bluetooth, and wherein the second communication protocol is a protocol other than Bluetooth.

20. The system of claim 15, wherein first communication interface used by the at least one presence terminal to communicate with wireless devices has a range of less than approximately 20 feet.

* * * * *